United States Patent [19]

Tsuchiya et al.

[11] Patent Number: 4,975,475

[45] Date of Patent: Dec. 4, 1990

[54] ELECTRODEPOSITION COATING COMPOSITION

[75] Inventors: Yasuyuki Tsuchiya, Hirakata; Shigeo Nishikawa, Kitakatsuragi; Kenshiro Tobinaga, Kawanishi; Keizou Ishii, Ashiya; Koichi Saito, Kyoto, all of Japan

[73] Assignee: Nippon Paint Co., Ltd., Osaka, Japan

[21] Appl. No.: 301,096

[22] Filed: Jan. 25, 1989

Related U.S. Application Data

[63] Continuation of Ser. No. 92,847, Sep. 3, 1987, abandoned.

[30] Foreign Application Priority Data

Sep. 4, 1986 [JP] Japan .................. 61-208943
Sep. 4, 1986 [JP] Japan .................. 61-208944
Sep. 10, 1986 [JP] Japan .................. 61-214888
Sep. 10, 1986 [JP] Japan .................. 61-214889

[51] Int. Cl.$^5$ .................. C08L 63/00; C08L 67/00

[52] U.S. Cl. .................. 523/411; 523/412; 204/181.7

[58] Field of Search .................. 204/181.4, 181.7; 524/901; 523/403, 406, 409, 410, 412, 413, 411

[56] References Cited

U.S. PATENT DOCUMENTS 4,416,753 11/1983 Batzill .................. 204/181.7
4,563,372 1/1986 Kurauchi .................. 427/409
4,624,762 11/1986 Abbey .................. 204/181.7

Primary Examiner—John F. Niebling
Assistant Examiner—Ben C. Hsing
Attorney, Agent, or Firm—Millen, White & Zelano

[57] ABSTRACT

An electrodeposition coating composition containing polymer microparticles of 0.01 to 20 microns size is disclosed. The polymer microparticles have a predetermined range of softening point, solubility parameter, refractive index or crosslinking density.

6 Claims, No Drawings

ELECTRODEPOSITION COATING COMPOSITION

This is a continuation of application Ser. No. 07/092,847 filed Sept. 3, 1987, now abandoned.

BACKGROUND OF THE INVENTION

Electrodeposition coating processes have been a widely used for applying anti-corrosive primer coatings to various metallic substrates such as automobile bodies because they are applicable to a variety of substrates regardless of shape or configuration and also hazardless to attendant workers and to the environment. Coating compositions used in the electrodeposition processes are in the form of an aqueous solution or dispersion of electrically charged resin particles. Accordingly, their stability and throwing power are important for the consistent operation of an electrodeposition coating line. With regard to finished coating films, it is desirable to have a large film thickness and high performance properties in such a field as automobile painting where a high corrosion and chipping resistance is essential. Furthermore, there is ever growing needs among users for coated articles having a highly aesthetic appearance in terms of sharpness and gloss.

It is known that the throwing power of an electrodeposition coating composition may be improved by incorporating thereto an amount of pigment particles having a suitable particle size. Japanese Laid Open patent application 58-47067 discloses the addition of resinous components used in a pulverulent coating composition into electrodeposition coating compositions to improve the throwing power thereof. Japanese Laid Open patent application 55-135180 proposes to incorporate an emulsion of polymers having a functional group capable of crosslinking with a base polymer in order to improve the throwing power of the electrodeposition coating composition containing said base polymer. Japanese Laid Open patent applications 55-49766 and 58-93762 disclose an electrodeposition coating composition containing crosslinked polymer particles or powder for use in giving a mat finish on a glaring surface such as aluminum or aluminum alloy substrates.

These known compositions containing pigment or resin particles suffer from certain disadvantages in that they are not so effective as desirable in enhancing the throwing power, that other properties such as storage stability or film appearance are adversely affected, and that they are not adapted for a wide variety of uses.

SUMMARY OF THE INVENTION

It is, therefore, a main object of the present invention to provide an electrodeposition coating composition containing an amount of polymer microparticles which can alleviate all or most of the above mentioned disadvantages of known compositions. Other advantages and objects of this invention will become apparent to those skilled in the art as the description proceeds.

According to this invention, there is provided an electrodeposition coating composition comprising:
  (a) an aqueous dispersion of a water-dispersible, electrically depositable resin; and
  (b) 1 to 50% by weight of the total solid content of the composition of polymer microparticles having a particle size from 0.01 to 20 microns uniformly dispersed in said aqueous dispersion, said polymer microparticles being characterized by having a softening point at least 10° C. higher than the bath temperature during the electrodeposition coating process of said composition, a solubility parameter which does not differ by more than 1.0 from the solubility parameter of said water-dispersible resin, a refractive index which differs by 0.02 to 0.3 from the refractive index of said water-dispersible resin, or a crosslinking density of 0.01 to 5.05 mmol/g.

It is preferable for the polymer microparticles to have on their surfaces ionic groups of the same polarity as said water-dispersible resin.

By incorporating the polymer microparticles having a softening point higher than the bath temperature by at least 10° C., it is possible to impart the composition with the throwing power more efficiently than is possible with the use of pigments. The temperature of electrodeposition coating baths is normally elevated by 7° to 8° C. during the electrodeposition coating process owing to the generation of Joule's heat. It is for this reason that the softening point of the polymer microparticles should be higher by at least 10° C. than the bath temperature. Thus the polymer microparticles will retain their particulate form in the bath during the electrodeposition coating process and can contribute to an increased throwing power.

When the polymer particles have a solubility parameter which does not differ by more than 1.0 from the solubility parameter of the water-soluble, electrically depositable base resin, they tend to adhere to particles of the base resin if the particle size is small enough relative to the particle size of the base resin. This results in increased dispersion stability of the base resin and also in high stability of the entire system containing the polymer microparticles.

The polymer microparticles having a refractive index which differs by 0.02 to 0.3 from the refractive index of the base resin may be used for forming a mat finish on glaring surfaces by the electrodeposition coating technique. The mat finish utilizes random reflection of light at the interface between the polymer microparticles and the matrix resin. This mat effect does not rely on the irregularly reflecting surfaces formed by the polymer microparticles as taught by the above-cited Japanese patent applications. Thus, the particle size of the polymer microparticles may be in a range from 0.01 to 2 microns which results in a microscopically flat surface finish. The addition of polymer microparticles in this particle size range into electrodeposition coating compositions does not adversely affect the stability and the workability of electrodeposition coating compositions.

Electrodeposition coating films are usually subjected to a baking step at an elevated temperature. If the coating film exhibits an excessive fluidity during this baking step, corners or edges of a coated substrate will not be fully covered by the coating film having desirable thickness.

Polymer microparticles having a particle size of 0.01 to 20 microns and a crosslinking density of 0.01 to 5.05 mmol/g may be used for controlling the fluidity of electrodeposition coating films during the curing step.

The polymer microparticles incorporated to the coating composition of this invention do not adversely affect the stability and the workability of the coating composition. Nor do they have any adverse effect on the finished coating film. They exhibit some advantageous effects on the properties of the resulting coating film.

DETAILED DISCUSSION

WATER-DISPERSIBLE, ELECTRICALLY DEPOSITABLE RESIN

This invention is applicable to both anodic and cathodic electrodeposition coating compositions. Water-dispersible resins usable in the electrodeposition coating process may be classified, depending upon their dispersed state, into the solution type, the dispersion type, the emulsion type and the suspension type. These types of resins are collectively referred to as "water-dispersible resins" herein. A wide variety of such resins are known and may be used in this invention.

Water-dispersible resins used in the anodic electrodeposition coating process must have an anionic functional group such as carboxyl group for imparting the resin with negative charges and for rendering the resin hydrophilic.

A variety of such resins are known including acrylic, polyester, polyether, phenolic, epoxy, polyurethane, poly amide, polybutadiene and oil based resins. Typical examples thereof are acrylic copolymers containing acrylic or meth acrylic acid, maleinized natural and synthetic drying oils, maleinized polybutadiene, half esters and half amides of maleinized oils and polymers.

Water-dispersible resins used in the cathodic electrodeposition coating process have a cationic functional group such as primary, secondary or tertiary amine moiety as a positively chargeable hydrophilic group. A variety of such resins are known including epoxy, polyether, polyester, polyurethane, polyamide, polybutadiene, phenolic and acrylic resins.

According to the curing mechanism of particular resins, they may be classified into three classes. The first one is those capable of self-crosslinking through a radical or oxidative polymerization reaction. The second class of resins requires a crosslinking agent such as melamine resins or blocked polyisocyanates. The third one utilizes both the self-crosslinking reaction and the cross-linking agent in combination.

According to the type of energy source required for initiating the crosslinking reaction, the water-dispersible, chargeable resins may also be classified into the ambient temperature curing, heat-curing and radiation e.g. UV or electron beam curing types.

The water-dispersible resins must be hydrophilic such that they are not soluble or dispersible in water when they are in the form of a free acid or free base, but become soluble or dispersible to make a stable aqueous solution or dispersion when at least 20% of the acid or base function is neutralized. If the water-dispersible resins are too hydrophilic, they fail to form a coating film having satisfactory water- or corrosion resistance and/or the application of electrodeposition coating processes become impossible.

In order to enhance various film properties, the water-dispersible resins are often used in the form of an emulsion in which said water-dispersible resin constitutes a continuous phase and a water-insoluble resin free from chargeable hydrophilic groups such as epoxy acrylate resin constitutes a dispersed phase.

The term "electrically depositable, water-dispersible resins" as used herein includes all of the aforesaid resins and resin mixtures. Further details of electrically depositable resins are well-known to those skilled in the art and thus need not be discussed herein.

POLYMER MICROPARTICLES

Several methods are known for preparing the polymer microparticles. One method includes the steps of emulsion or suspension polymerizing a mixture of ethylenically unsaturated monomers in an aqueous medium, and removing water from the emulsion by means of solvent substitution, azeotropic distillation, centrifugation, drying and the like.

Another method commonly referred to as the non-aqueous dispersion (NAD) method or precipitation polymerization method comprises polymerizing a mixture of ethylenically unsaturated monomers in a non-aqueous organic liquid such as aliphatic hydrocarbons having low solubility parameters or those solvents having high solubility parameters in which the monomer mixture is soluble but the polymer is insoluble to form a non-aqueous dispersion of the polymeric microparticles.

The polymeric microparticles used in the present invention may be prepared by any of these known methods.

The starting monomer mixture may contain, at least as a portion thereof, a monomer having at least two polymerizable sites per molecule or a combination of two monomers having mutually reactive groups to give microparticles which are internally cross-linked.

Examples of ethylenically unsaturated comonomers used for the production of microparticles include methyl (meth)acrylate, ethyl (meth)acrylate, n-butyl (meth)acrylate, isobutyl (meth)acrylate, 2-ethylhexyl (meth)acrylate, styrene, α-methylstyrene, vinyltoluene, t-butylstyrene, ethylene, propylene, vinyl acetate, vinyl propionate, acrylonitrile, methacrylonitrile, dimethylaminoethyl (meth) acrylate and the like. Two or more comonomers may be combined.

Cross-linking comonomers include a monomer having at least two ethylenically unsaturated bonds per molecule and the combination of two different monomers having mutually reactive groups.

Monomers having at least two polymerization sites may typically be represented by esters of a polyhydric alcohol with an ethylenically unsaturated monocarboxylic acid, esters of an ethylenically unsaturated monoalcohol with a polycarboxylic acid and aromatic compounds having at least two vinyl substituents. Specific examples thereof include ethylene glycol diacrylate, ethylene glycol dimethacrylate, triethylene glycol dimethacrylate, tetraethylene glycol dimethacrylate, 1,3-butylene glycol dimethacrylate, trimethylolpropane triacrylate, trimethylolpropane trimethacrylate, 1,4-butanediol diacrylate, neopentyl glycol diacrylate, 1,6-hexanediol diacrylate, pentaerythritol diacrylate, pentaerythritol triacrylate, pentaerythritol tetracrylate, pentaerythritol dimethacrylate, pentaerythritol trimethacrylate, pentaerythritol tetramethacrylate, glycerol diacrylate, glycerol allyloxy dimethacrylate, 1,1,1-tris hydroxymethyl)ethane diacrylate, 1,1,1-tris(hydroxymethyl)ethane triacrylate, 1,1,1-tris(hydroxymethyl)ethane dimethacrylate, 1,1,1-tris(hydroxymethyl)ethane trimethacrylate, 1,1,1-tris(hydroxymethyl)propane diacrylate, 1,1,1-tris(hydroxymethyl)propane triacrylate, 1,1,1-tris(hydroxymethyl)propane dimethacrylate, 1,1,1-tris(hydroxymethyl)propane trimethacrylate, triallyl cyanurate, triallyl isocyanurate, triallyl trimellitate, diallyl phthalate, diallyl terephthalate and divinyl benzene.

Combinations of two monomers having mutually reactive groups may be used in place of, or in addition to monomers having two or more polymerization sites. For example, monomers having a glycidyl group such as glycidyl acrylate or methacrylate may be combined with carboxyl group-containing monomers such as acrylic, methacrylic or crotonic acid. Also, hydroxyl group-containing monomers such as 2-hydroxyethyl (meth)acrylate, 2-hydroxypropyl (meth)acrylate, hydroxybutyl (meth)acrylate, allyl alcohol or methallyl alcohol may be combined with isocyanato group containing monomers such as vinyl isocyanate or isopropenyl isocyanate.

Polymer microparticle prepared from the combination of two monomers having mutually reactive groups are recovered by such conventional means as filtration, spray drying or lyophilization and then subjected to internally crosslinking by heating them optionally in the presence of a catalyst.

Polymer microparticles in an aqueous or nonaqueous medium may be isolated in a similar manner and used directly without heating or after milling to a suitable particle size. Alternatively, the dispersion containing the polymer micro particles may be subjected to solvent substitution and the resulting suspension in a new medium may be incorporated in the composition of this invention.

The average size or diameter of the polymer microparticles may be controlled by selecting an appropriate polymerization method. The emulsion polymerization and NAD method are suited for 0.01 to 0.6 micron range while the precipitation polymerization method is suited for 0.2 to 20 micron range.

It is preferable for the polymer microparticles used in the present invention to bear on their surfaces ionic groups having the same polarity as that of the binder resin to be combined i.e. an anionic group such as carboxylic or sulfonic acid group for anodic electrodeposition and a cathionic group such as amino group for cathodic electrode-position. This may be effected by incorporating a monomer having both ethylenic unsaturation and carboxyl group such as acrylic or methacrylic acid, or a monomer having both ethylenic unsaturation and a basic group such as dimethylaminoethyl (meth)acrylate or vinylpyridines to the monomer mixture constituting the polymer microparticles. Alternatively, the anionic or cathionic group may be given to the polymer microparticles by using a polymerization initiator which gives the acid or base terminal when polymerizing the monomer mixture.

The polymer microparticles having ionic groups may also be prepared by emulsion polymerizing monomer mixtures having no ionic group in the presence of an emulsifier having ionic groups, particularly amphoionic groups such as oligosoaps, polysoaps or reactive emulsifiers disclosed in Japanese Laid Open patent applications 56-24461, 57-21927 and 57-40522.

The polymer microparticles may also be prepared by polymerizing a mixture of ethylenically unsaturated monomers using the solution- or bulk polymerization technique, pulverizing the resulting polymer mass into microparticles and classifying or sieving the microparticles.

Polymer microparticles of thermosetting resins such as epoxy, melamine or alkyd resin may be prepared by emulsifying a liquid of said resin in an aqueous medium and then spray drying. Alternatively, a solid mass of said resin may be pulverized and sieved into microparticles of a suitable particle size range.

The softening point of the polymer microparticles may be controlled by varying the molecular weight thereof and/or the proportion of crosslinking monomer. The greater molecular weights and the greater proportions of crosslinking monomers generally give the higher softening points.

The solubility parameter of the polymer microparticles may be controlled by varying the monomer constitution thereof. In case of copolymers of ethylenically unsaturated monomers, the solubility parameter may be calculated from the proportions of particular comonomers.

The refractive index of a water-dispersible base resin may be determined by preparing a clear film of 30 to 50 micron thickness from the resin, and measuring the refractive index in alpha-bromonaphthalene medium at 20° C. using Abbe's refractometer. Similarly, the refractive index of the polymer microparticles may be determined by this method or it may be calculated according to the following equation:

$$nD = \Sigma C_1 n_1, C_2 n_2 \ldots c_m n_m$$

wherein $C_1, C_2 \ldots c_m$ represent the weight fractions of individual comonomers forming the polymer microparticles, and $n_1, n_2 \ldots n_m$ represent the refractive indexes of homopolymers of individual comonomers.

The crosslinking density of the polymer microparticles may be controlled by varying the molar fraction of crosslinking monomers in the monomer mixture forming the polymer microparticles.

ELECTRODEPOSITION COATING COMPOSITION

The electrodeposition coating composition of this invention comprises, as essential components, the aforesaid electrically depositable base resin and the polymer microparticles. The proportion of the polymer microparticles ranges from 1 to 50% by weight of the total solid content of the composition. If this proportion is too low, the effect of polymer microparticles can not be expected. Conversely, excessive addition of the microparticles tend to affect the storage stability and workability of the composition of this invention.

The coating composition of this invention may contain an auxiliary curing agent such as melamine resin, benzoguanamine resin, phenol resin or blocked polyisocyanate compounds, or a metallic dryer compound such as manganese, cobalt, copper, tin or lead compounds.

These components are uniformly dispersed in an aqueous medium containing a base in case of the anodic electrodeposition or an acid in case of the cathodic electrodeposition in an amount sufficient to neutralize at least 20% of the binder resin.

Examples of bases include ammonia, diethanolamine, triethanolamine, methylethanolamine, diethylamine, morpholine, and potassium hydroxide. Examples of acids include phosphoric acid, acetaic acid, propionic acid and lactic acid.

The aqueous medium is water or a mixture of water and a water-miscible organic solvent such as ethylcellosolve, propylcellosolve, butylcellosolve, ethyleneglycol dimethyl ether, diacetone alcohol, 4-methoxy 4-methylpentanone-2 or methyl ethyl ketone. A small amount of a water-immiscible organic solvent such as xylene, toluene, methyl isobutyl ketone or 2-ethylhexanol may be added to the mixture of water and the water-miscible organic solvent.

The electrodeposition coating composition of this invention may further contain conventional pigments such as titanium dioxide, ferric oxide, carbon black, aluminum silicate, precipitated barium sulfate, aluminum phosphomolybdate, strontium chromate, basic lead silicate or lead chromate.

The electrodeposition coating composition must have an electroconductivity from 0.1 to 5 mS/cm, preferably from 0.5 to 3 mS/cm. When this value is too low, it is difficult to obtain a film thickness having desired protective and other functions. Conversely, if the composition is too conductive, problems such as the dissolution of substrate or counter electrode in the bath, uneven film thickness or poor water- or corrosion resistance will arise.

The electrodeposition coating composition of this invention may be applied on a conductive substrate by the electrodeposition coating process at a nonvolatile content of 10 to 20% by weight to a dry film thickness of 15 to 30 microns. After applying, the resulting coating film may be cured at ambient or an elevated temperature, or by irradiating with UV or electron beam depending upon the nature of particular base resins.

The invention is further illustrated by the following examples in which all parts and percents are by weight unless otherwise specified.

PRODUCTION EXAMPLE 1

| | |
|---|---|
| NISSEKI polybutadiene B-1500[1] | 1000 g |
| ANTIGEN 6C[2] | 10 g |
| Maleic anhydride | 250 g |
| Diethylamine | 0.5 g |
| Deionized water | 20 g |
| Propylene glycol | 100 g |
| Ethylcellosolve | 340 g |

[1] Nippon Petrochemical Co., Ltd., 1,2-vinyl = 65%, trans = 14%, cis = 16%, Mn = 1500.
[2] Sumitomo Chemical Co., Ltd., N-methyl-N'-(1,3-dimethyl-butyl)-p-phenylenediamine.

A 2 liter flask equipped with a reflux condenser was charged with liquid polybutadiene, maleic anhydride and ANTIGEN 6C. The mixture was reacted at 190°-200° C. for about 5 hours. The completion of reaction was indicated by a color reaction test with dimethylaniline.

After the reaction mixture was cooled to 100° C., a mixture of deionized water and diethylamine was dripped over 30 minutes. Stirring was continued for about 1 hour until an acid number of 140 was reached. Thereafter, propylene glycol was reacted at 110° C. for 3 hours until an acid number of 125 was reached. After adding ethycellosolve, the mixture was stirred at 80° C. for about 1 hour to give a nonvolatile content of 80%.

PRODUCTION EXAMPLE 2

| | |
|---|---|
| EPOTOTO YD-014[3] | 950 g |
| Ethylcellosolve | 240 g |
| Hydroquinone | 10 g |
| Acrylic acid | 65 g |
| Dimethyl benzylamine | 5 g |

[3] Toto Kasei Co., Ltd., epoxy resin, epoxy equivalent = 950.

A 2 liter flask equipped with a reflux condenser was charged with EPOTOTO YD-014 and ethylcellosolve. The temperature was gradually raised to 120° C. with stirring to make a solution. To the solution were added hydroquinone, acrylic acid and dimethyl benzylamine. The mixture was allowed to react at 120° C. for 4 hours until an acid number less than 1 was reached.

PRODUCTION EXAMPLE 3

NISSEKI polybutadiene B-2000 ($\overline{Mn}$=2,000, 1,2-vinyl=65%) was epoxidized with peracetic acid to obtain an epoxidized polybutadiene having an oxirane oxygen content of 6.4%.

1,000 g of the epoxidized polybutadiene, 354 g of ethylcellosolve and 62.1 g of dimethylamine were reacted in a 2 liter autoclave at 150° C. for 5 hours. After unreacted dimethylamine was distilled off the residue was cooled to 120° C. A mixture of 79.3 g of acrylic acid, 7.6 g of hydroquinone and 26.4 g of ethylcellosolve was added to the residue and reacted therewith at 120° C. for 3 3/4 hours.

A cationic resin varnish having an amine number of 85.2 millimoles/100 g, an acid number of 100 millimoles/100 g, and a solid content of 75.0% was obtained.

PRODUCTION EXAMPLE 4

1,000 g of bisphenol A epoxy resin (EPIKOTE 1004, epoxy equivalent=950, Yuka Shell Epoxy Co., Ltd.) was dissolved in 343 g of ethylcellosolve. To the solution was added a mixture of 76.3 g of acrylic acid, 10 g of hydroquinone and 5 g of N,N-dimethylaminoethanol. The mixture was reacted at 100° C. for 5 hours to obtain a solution of epoxy acrylate resin having a solid content of 75%.

PRODUCTION EXAMPLE 5

1,000 g of NISSEKI polybutadiene B-1000 ($\overline{Mn}$=1,000, 1,2-vinyl=60%), 265.8 g of maleic anhydride, 1 g of ANTIGEN 6C (Sumitomo Chemical Industry Co., Ltd.) and 10 g of xylene were added to a 2 liter separable flask having a reflux condenser attached thereto. The mixture was reacted at 190° C. for 5 hours under nitrogen gas current. Unreacted maleic anhydride and xylene were distilled off in vacuo to obtain malleinized polybutadiene having an acid number of 214 millimoles/100 g.

1,000 g of the maleinized polybutadiene was reacted with 212.4 g of ethylcellosolve at 120° C. for 2 hours to open the acid anhydride ring. A half ester of maleinized polybutadiene having a solid content of 98% was obtained.

PRODUCTION EXAMPLE 6

| | |
|---|---|
| Epoxydized polybutadiene, E 1800-6.5 (Nippon Petrochemical Co., Ltd.) | 1000 g |
| Butylcellosolve | 349 g |
| Dimethylamine | 46 g |
| 50% Lactic acid | 138 g |
| Deionized water | 473 g |
| Phenyl glycidyl ether | 117 g |

An autoclave was charged with epoxidized polybutadiene E 1800-6.5, buthylcellosolve and dimethylamine. The mixture was reacted at 150° C. for 5 hours. After unreacted dimethylamine was distilled off, the product was cooled to 60° C., diluted with a mixture of 50% lactic acid and deionized water, and then stirred at 80° C. for 30 minutes. Then phenyl glycidyl ether was added and the temperature was raised to 110° C. The reaction was continued at the same temperature with stirring until the acid number of the reaction product was less than 0.1 when titrating with alcoholic potassium hydroxide using phenolphthalain indicator. A solution of cationic resin having a nonvolatile content of 55% was obtained.

PRODUCTION EXAMPLE 7

426 parts of deionized water placed in a flask having stirring means and a thermometer were heated to 80° C. Then a solution of 1 part of ammonium persulfate in 20 parts of deionized water and a first monomer mixture of 5 parts of styrene and 5 parts of n-butyl acrylate were added dropwise and reacted for 10 minutes. To the reaction mixture were further added dropwise a solution of 1 part of ammonium persulfate and a second monomer mixture consisting of 30 parts of styrene, 30 parts of methyl methacrylate, 30 parts of n-butyl acrylate and 10 parts 2-hydroxyethyl methacrylate concurrently over 60 minutes. The mixture was maintained at 80° C. for 2 hours to complete the reaction. A dispersion of anionic polymer microparticles having a nonvolatile content of 35%, a particle size of 320 nm and a softening point of 70° C. was obtained.

PRODUCTION EXAMPLE 8

To a two liter flask having stirring means, a reflux condenser, temperature-controlling means, a nitrogen gas-introducing tube and a decanter were added 73.5 parts of sodium taurinate, 100 parts of ethylene glycol, and 200 parts of ethylene glycol monomethyl ether. The temperature was raised to 120° C. with stirring to give a uniform solution. To the solution was added with stirring a solution of 470 parts of EPIKOTE 1001 (Shell Chemical Company, bisphenol A diglycidyl ether epoxy resin having an epoxy equivalent of 470) in 400 parts of ethylene glycol monomethyl ether over 2 hours. The mixture was stirred at the same temperature for additional 20 hours to give 518 parts of modified epoxy resin. The resin had an acid number of 49.4 (KOH titration) and a sulfur content of 2.8% (X ray fluorometry).

To a one liter flask equipped with stirring means, cooling means and temperature control means were added 306 parts of deionized water, 7.5 parts of the modified epoxy resin as prepared above and 1 part of dimethylethanolamine. The mixture was stirred at 80° C. to make a solution. To the solution was added a solution of 4.8 parts of azobiscyano valeric acid in 45 parts of deionized water containing 4.56 parts of dimethylethanolamine. Then a monomer mixture consisting of 85.7 parts of styrene, 114.3 parts of methyl methacrylate, 28.6 parts of n-butyl acrylate and 14.3 parts of diethylaminoethyl methacrylate was added dropwise over 60 minutes. After the addition of monomer mixture, a solution of 1.2 parts of azobiscyanovaleric acid in 12 parts of deionized water containing 1.14 parts of dimethylethanolamine was added. The mixture was stirred for additional 60 minutes at 80° C. to give an aqueous dispersion of cationic polymer microparticles having a nonvolatile content of 35%, a particle size of 128 nm and a softening point of 70° C. and a solubility parameter of 10.1.

PRODUCTION EXAMPLE 9

The procedure of Production Example 7 was followed by replacing the second monomer mixture used therein with a monomer mixture consisting of 40 parts of methyl methacrylate, 20 parts of n butyl acrylate, 30 parts of styrene and 10 parts of 2-hydroxyethyl methacrylate. A dispersion of anionic polymer microparticles having a nonvolatile content of 35%, a particle size of 196 nm, and a solubility parameter of 10.1.

PRODUCTION EXAMPLE 10

A reactor having stirring means was charged with 216 parts of deionized water. A solution of 4.5 parts of azobiscyanovaleric acid and 4.9 parts of triethylamine in 45 parts of deionized water was added to the reactor with stirring while maintaining the inner temperature at 80° C. Then a first mixture consisting of 6 parts of N-dodecyl-N-vinyltaurine, 2.4 parts of triethylamine and 90 parts of deionized water and a second mixture consisting of 156 parts of methyl methacrylate, 135 parts of n-butyl acrylate and 3 parts of ethyleneglycol dimethacrylate were concurrently added dropwise over 60 minutes. After the addition of the first and second mixtures, a solution of 1.5 parts of azobiscyanovaleric acid in 15 parts of deionized water containing 1.6 parts of triethylamine was added. The mixture was stirred for additional 60 minutes at 80° C. to give a dispersion of anionic polymer microparticles having a nonvolatile content of 45% and a particle size of 132 nm. The refractive index was 1.479.

PRODUCTION EXAMPLE 11

The procedure of Production Example 7 was followed by replacing the first and second monomer mixtures used in production Example 7 with a mixture consisting 5 parts of styrene, 4.5 parts of n-butyl acrylate and 0.5 parts of neopentylglycol dimethacrylate and another monomer mixture consisting of 10 parts of methyl methacrylate, 10 parts of n-butyl acrylate, 60 parts of styrene and 10 parts of ethyleneglycol dimethacrylate, respectively. The particle size of the resulting emulsion was 208 nm. This emulsion was spray dried to give nonionic polymer microparticles having an average diameter of 5 microns and a refractive index of 1.547.

PRODUCTION EXAMPLE 12

To a two liter flask having stirring means, a reflux condenser, temperature control means, a nitrogen gas-introducing tube and a decanter were added 134 parts of N,N-bis(hydroxyethyl)taurine, 130 parts of neopentyl glycol, 236 parts of azelaic acid, 186 parts of phthalic anhydride, and 27 parts of xylene. The mixture was refluxed and water was removed as an azoetropic mixture with xylene. The temperature was raised to 190° C. over 2 hours and the reaction was continued with stirring until an acid number of 145 was reached.

The reaction product was cooled to 140° C. and 314 parts of CARDURA E-10 (glycidyl versatate, Shell Chemical Company was added dropwise over 30 minutes at 140° C. The reaction was continued for additional two hours with stirring. A polyester resin having an acid number of 59, a hydroxyl number of 90 and a number average molecular weight ($\overline{Mn}$) of 1054 was obtained.

To a one liter flask equipped with stirring means, cooling means and temperature-control means were added 306 parts of deionized water, 45 parts of the above polyester resin and 4.5 parts of dimethylethanolamine. The mixture was stirred at 80° C. to make a solution. To the solution was added a solution of 4.5 parts of azobiscyanovaleric acid in 45 parts of deionized water containing 4.3 parts of dimethylethanolamine. Then a monomer mixture consisting of 70.7 parts of styrene, 70.7 parts of methyl methacrylate, 94.2 parts of n butyl acrylate, 30 parts of 2-hydroxyethyl acrylate and 4.5 parts of ethyleneglycol dimethacrylate was added dropwise over 60 minutes. After the addition of monomer mixture, a solution of 1.5 parts of azobiscyanovaleric acid in 15 parts of deionized water containing 1.4 parts of dimethylethanolamine was added. The mixture was stirred for additional 60 minutes at 80° C. to give an aqueous dispersion of anionic polymer microparticles having a nonvolatile content of 45% and a particle size of 43 nm. The crosslinking density was 0.084 mmol/g.

PRODUCTION EXAMPLE 13

The procedure of Production Example 12 was followed by replacing the monomer mixture used therein with a monomer mixture consisting of 55.7 parts of styrene, 41.7 parts of methyl methacrylate, 13.9 parts of n-butyl acrylate, 83.5 parts of ethyleneglycol dimethacrylate and 5.6 parts of dimethylaminopropyl methacrylate. A dispersion of cationic polymer microparticles having a nonvolatile content of 45%, a particle size of 51 nm and a crosslinking density of 1.562 mmol/g was obtained.

PRODUCTION EXAMPLE 14

To the same flask as used in Production Example 12 were placed 100 parts of ethyleneglycol monomethyl ether. Two drip funnels were mounted to the flask. A solution of 75 parts of N-methyl-N (vinylbenzyl) taurine in 100 parts of ethyleneglycol monomethyl ether containing a small amount of dimethylethanolamine was placed into one funnel. A monomer mixture consisting of 50 parts of 2-hydroxyethyl acrylate, 10 parts of acrylic acid, 110 parts of methyl methacrylate, 110 parts of styrene and 145 parts of n-butyl acrylate was placed into the other funnel. A mixture of 10 parts laurylmercaptan and 10 parts of azobisbutyronitrile was dissolved in the monomer mixture.

The contents of two funnels were then added dropwise to the flask at 100° C. over 120 minutes. After the addition, the mixture was stirred at 100° C. for 60 minutes and evaporated in a rotary evaporator to remove the solvent. An acrylic resin having a solid content of 96% and a number average molecular weight of 4500 was obtained.

A one liter flask equipped with stirring means, condenser and temperature controlling means was charge with 306 parts of deionized water, 18 parts of the above acrylic resin and 2.6 parts of dimethylethanolamine. The content was heated to 80° C. with stirring to make a solution. A solution of 4.8 parts of azobiscyanovaleric acid in 48 parts of deionized water containing 4.56 parts of dimethylethanolamine was added with stirring while maintaining the inner temperature at 80° C. A monomer mixture consisting of 74.7 parts of styrene, 74.7 parts of methyl methacrylate, 30 parts of 2-hydroxyethyl methacrylate, 99.6 parts of n-butyl acrylate and 3 parts of ethyleneglycol dimethacrylate was added dropwise over 60 minutes. After the addition, a solution of 1.2 parts of azobiscyanovaleric acid in 12 parts of deionized water containing 1.14 parts of dimethylethanolamine was added at the same temperature. The reaction was continued with stirring for further 60 minutes. A dispersion of anionic polymer microparticles having a particle size of 132 nm, a crosslinking density of 0.054 mmol/g and a nonvolatile content of 45% was obtained.

PRODUCTION EXAMPLE 15

The procedure of Production Example 14 was followed except that the monomer mixture consisted of 26.6 parts of styrene, 79.8 parts of methyl methacrylate, 53.2 parts of n-butyl acrylate, 53.2 parts of ethylene glycol dimethacrylate, 53.2 parts of ethyl acrylate and 16.0 parts of diethylaminoethyl acrylate. A dispersion of cationic polymer dispersion having a particle size of 146 nm, a crosslinking density of 0.953 mmol/g and a nonvolatile content of 45% was obtained.

PRODUCTION EXAMPLE 16

The procedure of Production Example 8 was followed except that the monomer mixture consisted of 80 parts of styrene, 80 parts of methyl methacrylate, 107 parts of n-butyl acrylate, 30 parts of 2-hydroxyethyl acrylate and 3 parts of ethyleneglycol dimethacrylate. A dispersion of anionic polymer microparticles having a particle size of 112 nm, a crosslinking density of 0.051 mmol/g and a nonvolatile content of 45% was obtained.

PRODUCTION EXAMPLE 17

A one liter flask equipped with a stirrer, thermometer, funnel and air pipe was charged with 60 parts of succinic anhydride, 440 parts of PLACCEL FM-5 (5:1 adduct of $\epsilon$-caprolactone and 2 -hydroxyethyl methacrylate sold by DAICEL CHEMICAL INDUSTRIES, LTD.) and 500 ppm of hydroquinone monomethyl ether. The mixture was reacted at 150° C. for 60 minutes with stirring while introducing air. After cooling, the reaction mixture was filtered to remove a small amount of unreacted acid anhydride crystals. A semi-solid product having an acid number of 70 was obtained. This reaction product was used after neutralizing with dimethylethanolamine to 100% neutralization.

To the same flask as used in Production Example 12 were placed 280 parts of deionized water. A mixture consisting of 20 parts of the above reaction product, 16 parts methyl methacrylate, 20 parts of n-butyl acrylate, 14 parts of ethyleneglycol dimethacrylate and 30 parts of styrene was added dropwise at an inner temperature of 80° C. over 2 hours with stirring. At the same time, a solution of 1 part of ammonium persulfate in 20 parts of deionized water was added concurrently with the monomer mixture.

A dispersion of anionic polymer microparticles having a nonvolatile content of 25% was obtained. The particle size was 76 nm when measured by the laser scattering method. The crosslinking density was 0.0884 mmol/g.

EXAMPLE 1

125 parts of the varnish of Production Example 1, 75 parts of the varnish of Production Example 2, 40 parts of butylated methylolmelamine (50% nonvolatile), 40 parts of resol type phenolic resin (50% nonvolatile), 2 parts of non-ionic surfactant and 3 parts of cobalt naphthenate were thoroughly mixed. To the mixture were added 13 parts of triethylamine and 707 parts of deionized water with stirring. Then 60 parts of the dispersion of Production Example 7 were incorporated to the mixture. A coating composition having a solid content of about 20% and a polymer microparticle content of about 2% was obtained.

The above composition was deposited electrically on a zinc phosphate-treated steel plate used as anode at 150 V for 3 minutes. The coated plate was then rinsed with water and baked at 140° C. for 30 minutes to give a cured film having a thickness of about 20 microns. The resulting coating film was tested for its properties including throwing power.

The results are shown in Table I.

EXAMPLE 2

125 parts of the varnish of Production Example 1 were neutralized with 13 parts of triethylamine and then diluted with 250 parts of deionized water to a nonvolatile content of 26%. Then 150 parts of titanium dioxide, 50 parts of lead silicate, 25 parts of strontium chromate and 25 parts of carbon black were added. The mixture was stirred in a disperser for about 1 hour. After adding an amount of glass beads, the mixture was thoroughly dispersed in a sand mill to a particle size less than 20 microns and filtered to remove the glass beads. A pigment paste having a nonvolatile content of 55% was produced.

EXAMPLE 3

125 parts of the varnish of Production Example 1, 75 parts of the varnish of Production Example 2, 40 parts of butylated methylolmelamine (50% nonvolatile), 40 parts of resol type phenolic resin (50% nonvolatile), 2 parts of non-ionic surfactant and 3 parts of cobalt naphthenate were thoroughly mixed. To the mixture were added 13 parts of triethylamine and 707 parts of deionized water with stirring. Then 125 parts of the pigment paste of Example 2, 220 parts of deionized water and 80 parts of the dispersion of Production Example 7 were added to the mixture. An electrodeposition coating enamel having a polymer microparticle content of about 2% was prepared.

This composition was deposited electrically and baked as in Example 1 except that the voltage was 200 V. The properties of the resulting coating film are shown in Table I.

EXAMPLE 4

400 parts of the cationic resin solution of Production Example 3, 240 parts of the resin solution of Production Example 4 and 19.2 parts of the resin solution of Production Example 5 were thoroughly mixed. The mixture was neutralized with 8.1 parts of acetic acid and diluted with 1,835 parts of deionized water. To the mixture were added 200 parts of the dispersion of Production Example 8. This gave a cathodic electrodeposition coating composition having a solid content of about 20% and a polymer microparticle content of about 3%.

This composition was deposited electrically on a zinc phosphate-treated steel plate used as cathode at 150 V for 3 minutes. The coated plate was then rinsed with water and baked at 175° C. for 30 minutes to give a cured film having a thickness of about 20 microns. Properties of the film are shown in Table I.

EXAMPLE 5

231 parts of tho varnish of Production Example 6 were dissolved in 315 parts of deionized water. To the solution was added a pigment mixture consisting of 16 parts of carbon black, 92 parts of titanium dioxide, 220 parts of kaolin, 58 parts of basic lead silicate and an amount of glass beads. The mixture was thoroughly dispersed in a sand mill to a particle size less than 20 microns and filtered to remove glass beads. A pigment paste having a nonvolatile content of 55% was produced.

EXAMPLE 6

400 parts of the cationic resin solution of Production Example 3, 240 parts of the resin solution of Production Example 4 and 19.2 parts of the resin solution of Production Example 5 were thoroughly mixed. The mixture was neutralized with 8.1 parts of acetic acid and diluted with 1,835 parts of deionized water. To the mixture were added 360 parts of the pigment paste of Example 5, 550 parts of deionized water and 260 parts of the dispersion of Production Example 8. A cathodic electrodeposition enamel having a polymer microparticle content of about 2% was obtained.

Electrodeposition coating was carried out using the above enamel in the same way as Example 4 except that the voltage was 200 V. Properties of the resulting coating film are shown in Table I.

COMPARATIVE EXAMPLE 1

Example 1 was followed except that the polymer microparticles produced in Production Example 7 were not added and the amount of deionized water was decreased from 707 parts to 662 parts. The electrodeposition was carried gut at 100 V.

COMPARATIVE EXAMPLE 2

Example 3 was followed except that the polymer microparticles of Production Example 7 were not added and the amount of deionized water was decreased from 707 parts to 662 parts. The electrodeposition was carried out at 150 V.

COMPARATIVE EXAMPLE 3

Example 4 was followed except that the polymer microparticles of Production Example 8 were not added and the amount of deionized water was decreased from 1,835 parts to 1,800 parts. The electrodeposition was carried out at 100 V.

COMPARATIVE EXAMPLE 4

Example 6 was followed except that the polymer microparticles of Production Example 8 were not added and the amount of deionized water was decreased from 1,835 parts to 1,800 parts. The electrodeposition was carried out at 150 V.

TABLE I

|  | Ex. 1 | Ex. 3 | Comparative Ex. 1 | Comparative Ex.2 | Ex. 4 | Ex. 6 | Comparative Ex.3 | Comparative Ex. 4 |
| --- | --- | --- | --- | --- | --- | --- | --- | --- |
| Throwing power[1] (cm) | 17 | 19 | 12 | 16 | 18 | 21 | 14 | 18 |
| Salt spray test[2] |  |  |  |  |  |  |  |  |
| 240 hrs. | Δ |  | Δ |  | — | — | — | — |
| 480 hrs. | — | — | — | — | Δ |  | Δ |  |

(1) Evaluation of Throwing Power

The test composition is placed in a cylindrical stainless steel cell of 100 mm inner diameter and 300 mm depth, and maintained at a temperature of 30° C.±1° C.

A pretreated steel strip of 310 mm length×16 mm width×0.3 mm—0.8 mm thickness is inserted within the bore of a steel pipe of 17.5 mm inner diameter×300 mm length. This assemblage is immersed vertically into the liquid to a depth of 254 mm with the lower edges of the pipe and strip being flush. The assemblage is connected to a DC current source as one electrode. The stainless steel cell is used as a counter electrode.

Then electric current is applied across both electrodes for 30 second to reach a predetermined voltage required for forming 20 micron film thickness. The coating bath is stirred into vortex during the electrodeposition process.

Thereafter, the steel strip substrate is removed from the coating bath, rinsed with water and baked under predetermined conditions. After removing feather-like film sections from the upper area of the substrate, the length of remaining coating films on either side was noted. The throwing power is represented as the mean length of the remaining films on both sides.

(2) Salt Spray Test

A 5% saline is used. Evaluation is made by one half of the maximum width of rust developed from the cut edge of applied film according to the following schedule:

less than 3 mm; Δ 3–5 mm; X greater than 5 mm.

EXAMPLE 7

Example 4 was repeated using the same coating composition immediately after its preparation and after a storage period for 3 months in order to evaluate the storage stability thereof. The solubility parameters are 10.6 for the varnish mixture and 10.1 for the polymer microparticles.

The results are shown in Table II.

EXAMPLE 8

Example 6 was repeated using the same coating composition immediately after its preparation and after a storage period for 3 months in order to evaluate the storage stability thereof.

The solubility parameters are 10.6 for the varnish mixture and 10.1 for the polymer microparticles.

The results are shown in Table II.

added 13 parts of triethylamine and 707 parts of deionized water with stirring to give a varnish mixture having a solubility parameter of 10.5. Then 47 parts of the dispersion of Production Example 9 having a solubility parameter of 10.1 were added to the varnish mixture. A coating composition having a solid content of about 20% and a polymer microparticle content of about 2% was obtained.

The above composition was deposited on a zinc phosphate-treated steel plate used as anode immediately after its preparation as in Example 1. The electrodeposition was repeated again after a storage period for 3 months in order to evaluate the storage stability of the coating composition.

The results are shown in Table II.

EXAMPLE 10

125 parts of the varnish of Production Example 1, 75 parts of the varnish of Production Example 2, 40 parts of butylated methylolmelamine (50% nonvolatile), 40 parts of resol type phenolic resin (50% nonvolatile), 2 parts of non-ionic surfactant and 3 parts of cobalt naphthenate were thoroughly mixed. To the mixture were added 13 parts of triethylamine and 707 parts of deionized water with stirring to give a varnish mixture having a solubility parameter of 10.5. Then 125 parts of the pigment paste of Example 2, 220 parts of deionized water and 80 parts of the dispersion of Production Example 9 having a solubility parameter of 10.1 were added to the varnish mixture. An electrodeposition coating enamel having a polymer microparticle content of about 2% was prepared.

This composition was deposited electrically and baked as in Example 9 and tested for storage stability.

The results are shown in Table II.

COMPARATIVE EXAMPLE 5

Comparative Example 3 was repeated for testing the resulting composition for storage stability.

COMPARATIVE EXAMPLE 6

Comparative Example 4 was repeated for testing the resulting composition for storage stability.

COMPARATIVE EXAMPLE 7

Comparative Example 1 was repeated for testing the resulting composition for storage stability.

COMPARATIVE EXAMPLE 8

Comparative Example 2 was repeated for testing the resulting composition for storage stability.

TABLE II

| Immediately after preparation | Ex. 7 | Ex. 8 | Comparative Ex. 5 | Comparative Ex. 6 | Ex. 9 | Ex. 10 | Comparative Ex. 7 | Comparative Ex. 8 |
|---|---|---|---|---|---|---|---|---|
| Filtering smoothness[1] | | | | | | | | |
| Film appearance[2] | | | | | | | | |
| After 3 months storage | | | | | | | | |
| Filtering smoothness[1] | | | Δ | X | | | Δ | X |
| Film appearance[2] | | | Δ | X | | | Δ | X |

EXAMPLE 9

125 parts of the varnish of Production Example 1, 75 parts of the varnish of Production Example 2, 40 parts of butylated methylolmelamine (50% nonvolatile), 40 parts of resol type phenolic resin (50% nonvolatile), 2 parts of non-ionic surfactant and 3 parts of cobalt naphthenate were thoroughly mixed. To the mixture were (1) 2,000 g of a sample is filtered through a 300 mesh screen (immediately after preparation) or a 400 mesh screen (after 3 months) having an effective area of 900 cm². Evaluation is made according to the following schedule:

: Sample can be filtered smoothly without residue on the screen.

Δ: Sample can be filtered but a substantial amount of residue remains on the screen.

X: Filtering is hardly possible due to clogging.

(2) Sample is applied on a horizontally placed substrate to a dry film thickness of 20 microns. Evaluation is made according to the following schedule:

: Smooth finish free of agglomerate.

Δ: Relatively smooth finish with some agglomerates.

X: Fully covered with agglomerates.

EXAMPLE 11

125 parts of the varnish of Production Example 1, 75 parts of the varnish of Production Example 2, 40 g of butylated methylolmelamine (50% nonvolatile), 40 parts of resol type phenolic resin, 2 parts of nonionic surfactant and 3 parts of cobalt naphthenate were thoroughly mixed. The mixture was neutralized with 13 parts of triethylamine and then diluted with 707 parts of deionized water. The resulting varnish mixture gave a transparent film have a refractive index of 1.41.

Then 47 parts of the polymer microparticle dispersion of Production Example 10 having a refractive index of 1.479 were added to the above varnish mixture with stirring. An anodic electrodeposition coating composition having a solid content of about 20% and a polymer microparticle content of about 2% was prepared.

This composition was deposited electrically on a zinc phosphate-treated steel plate used as anode at 150 V for 3 minutes. Then the coated substrate was rinsed with water and baked at 140° C. for 30 minutes to give a film having a thickness of 20 microns. This film was tested for 60° gloss.

The result is shown in Table III.

EXAMPLE 12

400 parts of the varnish of Production Example 3, 240 parts of the varnish of Production Example 4 and 19.2 parts of the varnish of Production Example 5 were thoroughly mixed and neutralized with 8.1 parts of acetic acid. The varnish mixture gave a transparent film having a refractive index of 1.43.

To the varnish mixture were added 200 parts of dry polymer microparticles of Production Example 11 and 1,835 parts of deionized water. A cathodic electrodeposition coating composition having a solid content of about 20% and a polymer microparticle content of about 3% was prepared.

This composition was deposited electrically on a zinc phosphate-treated steel plate used as cathode at 100° C. for 3 minutes. Then the coated substrate was rinsed with water and baked at 175° C. for 30 minutes to give a film having a thickness of 20 microns. The film was tested for 60° gloss.

The result is shown in Table III.

COMPARATIVE EXAMPLE 9

Example 11 was followed except that the polymer microparticles of Production Example 10 were not added.

COMPARATIVE EXAMPLE 10

Example 12 was followed except that the polymer microparticles of Production Example 11 were not added.

TABLE III

| | Ex. 11 | Ex. 12 | Comparative Ex. 9 | Comparative Ex. 10 |
|---|---|---|---|---|
| 60° Gloss | 40 | 18 | 85 | 40 |

EXAMPLE 13

970 parts EPON 1001 (epoxy resin, sold by Shell Chemical Company, epoxy equivalent 485) and 265 parts of polycaprolactone diol (sold under the name of PCP 0200 by Union Carbide Corporation, M.W. about 543) were placed in a suitable reactor and heated to 100° C. in a nitrogen gas atmosphere. 0.46 parts of dimethylbenzylamine were added to the mixture and allowed to react at 130° C. for 1.5 hours. Then the reaction mixture was cooled to 110° C. To this were added 110 parts of methyl isobutyl ketone, 39.8 parts of a 73% solution of diethylenotriamine methyl isobutyl ketimine in methyl isobutyl ketone, and 100 parts of methyl isobutyl ketone. Then the mixture was cooled to 70° C. After adding 53.1 parts of diethylamine, the mixture was heaLed at 120° for 3 hours to complete the reaction. The resulting solution referred to as "First Liquid" has a nonvolatile content of 75%.

Using a separate reactor, 291 parts of toluenediisocyanate (mixture of 2,4- and 2,6-isomers at a ratio of 80:20) were reacted with 218 parts of 2-ethylhexanol for 0.5 hours in a nitrogen atmosphere with stirring at 38° C. while cooling externally. The reaction mixture was then heated to 60° C. To this were added 75 parts of trimethylolpropane and 0.08 parts of dibutyltin dilaurate. The mixture was allowed to react for 1.5 hours at 121° C. until substantially all isocyantto function disappeared when confirmed IR spectrometrically. This reaction product was diluted with 249 parts of ethyleneglycol monomethyl ether to give a solution referred to as "Second Liquid" having a nonvolatile content of 70%.

576 parts of First Liquid, 217 parts of Second Liquid, 13.2 parts of dibutyltin dilaurate, 12.3 parts of glacial acetic acid were thoroughly mixed. After diluting the mixture with 705.5 parts of deionized water, 39 parts of ethyleneglycol monohexyl ether, 1,880 parts of deionized water and 145 parts of the dispersion of Production Example 15 were added thereto. A cathodic electrodeposition coating composition having a solid content of about 20% and a polymer microparticle content of about 2% was prepared.

This composition was deposited on a zinc phosphatetreated steel plate at 60 V for 3 minutes. Then the coated substrate was rinsed with water, and baked at 175° C. for 30 minutes to give a film having a thickness of 20 microns. The coated plate was tested for the smoothness of film surface and the coverage of edge areas.

The results are shown in Table IV.

EXAMPLE 14

320 parts of Second Liquid prepared in Example 13 and 87.2 parts of dimethylethanolamine were reacted in a suitable reactor exothermally at 80° C. for 1 hour with stirring. Then 117.6 parts of a 75% aqueous solution of lactic acid and 39.2 parts of butylcellosolve were added thereto. The mixture was stirred at 65° C. for additional 30 minutes to give a quaternizing agent.

Using a separate reactor, 710 parts of EPON 829 (reaction product of epichlorhydrine and bisphenol, sold by Shell Chemical Company, epoxy equivalent about 193) and 289.6 parts of bisphenol A were reacted exothermally in a nitrogen gas atmosphere at 150°–160° C. for 1 hour. Then the reaction mixture was cooled to 120° C. A portion of 406.4 parts of Second Liquid of Example 13 was added thereto and allowed to react at 110°–120° C. for about 1 hour. After cooling to 85°–95° C., the reaction mixture was diluted with 56.76 parts of butylcellosolve and 71.2 parts of deionized water. Then the remaining portion of Second Liquid of Example 13 was added and allowed to react at 80°–85° C. until an acid number 1 was reached.

1,024 parts of the resulting vehicle was diluted to a solid content of 30% with 241 parts of butylcellosolve and 1,122 parts of deionized water. To this were added 1,666 parts of kaolin, 204.4 parts of lead silicate and 71.4 parts of dibutyltin oxide. After mixing for 1 hour in a disperser, an amount of glass beads was added to the mixture. Then the mixture was dispersed in a sand mill to a particle size of less than 20 microns and filtered to remove glass beads. A pigment paste having a solid content of 55% was prepared.

A mixture of 576 parts of First Liquid of Example 13, 217 parts of Second Liquid of Example 13 and 13.2 parts of dibutyltin dilaurate was neutralized with 12.3 parts of glacial acetic acid and diluted with 705.5 parts of deionized water. After adding 39 parts of ethyleneglycol monohexyl ether and 1,880 parts of deionized water, 360 parts of the above pigment paste, 630 parts of deionized water and 190 parts of the dispersion of Production Example 15 were mixed to give a cathodic electrodeposition enamel having a polymer microparticle content of about 2%.

This composition was deposited electrically on a zinc phosphate-treated steel plate under the same conditions as Example 13. The electrodeposition voltage was 100 V. Film properties are shown in Table IV.

EXAMPLE 15

Example 14 was followed except that the dispersion of Production Example 8 was replaced by 156 parts of the dispersion of cationic polymer microparticles prepared in Production Example 13. Film properties are shown in Table IV.

EXAMPLE 16

Example 6 was followed except that the dispersion of Production Example 8 was replaced by 140 parts of the dispersion of cationic polymer microparticles of Production Example 15. Film properties are shown in Table IV.

EXAMPLE 17

Example 1 was followed except that the dispersion of Production Example 7 was replaced by 60 parts of the dispersion o Production Example 12. Film properties are shown in Table IV.

EXAMPLE 18

Example 3 was followed except that the dispersion of Production Example 7 was replaced by 80 parts of the dispersion of Production Example 14. Film properties are shown in Table IV.

EXAMPLE 19

Example 3 was followed except that the dispersion of Production Example 7 was replaced by 80 parts of the dispersion of Production Example 16. Film properties are shown in Table IV.

EXAMPLE 20

Example 3 was followed except that the dispersion of Production Example 7 was replaced by 80 parts of the dispersion of Production Example 17. Film properties are shown in Table IV.

COMPARATIVE EXAMPLE 11

Example 13 was followed except that the polymer microparticles of Production Example 13 were not added and the voltage was 50 V.

COMPARATIVE EXAMPLE 12

Example 14 was followed except that the polymer microparticles of Production Example 15 were not added and the voltage was 80 V.

COMPARATIVE EXAMPLE 13

The same as Comparative Example 1.

COMPARATIVE EXAMPLE 14

The same as Comparative Example 2.

TABLE IV

|  | Example | | | | | | | | Comparative Example | | | |
| --- | --- | --- | --- | --- | --- | --- | --- | --- | --- | --- | --- | --- |
|  | 13 | 14 | 15 | 16 | 17 | 18 | 19 | 20 | 11 | 12 | 13 | 14 |
| Surface smoothness[1] | | | | | | | | | | | | |
| Edge coverage[2] | | | Δ | | | Δ | | | X | X | X | X |

[1] : Very smooth;   : Fairly smooth.
[2] Micrographic Judgement.
  : Fully covered.
  : Fairly covered.
Δ: Partly exposed areas are present.
X: Fully exposed areas are present.

We claim:

1. An electrodeposition coating composition comprising:
   (a) an aqueous dispersion of a water-dispersible, electrically depositable cation resin in an aqueous medium containing an amount of acid sufficient to achieve at least 20% neutralization of said resin; and
   (b) 1 to 50% by weight of the total solid content of the composition of internally crosslinked polymeric microparticles having a particle size from 0.01 to 20 microns uniformly dispersed in said aqueous dispersion, said polymer microparticles being prepared by polymerizing a mixture of ethylenically unsaturated monomers comprising a monomer having at least two polymerizable sites per molecule said polymer microparticles being electrically neutral or cationic and having a crosslinking density of 0.01 to 5.05 mmol/g.

2. The electrodeposition coating composition of claim 1, wherein said monomer mixture is polymerized by the emulsion, NAD or precipitation polymerization method.

3. The electrodeposition coating composition of claim 2 having an electroconductivity from 0.1 to 5 mS/cm.

4. The electrodeposition coating composition of claim 3 having an electroconductivity from 0.5 to 3 mS/cm.

5. The electrodeposition coating composition of claim 2 wherein the polymer microparticles have a refractive index which differs by 0.02 to 0.3 from the refractive index of said cationic resin.

6. The electrodeposition coating composition of claim 2, wherein the polymer microparticles have a solubility parameter which differs by no more than 1.0 from the solubility parameter of said cationic resin.

* * * * *